United States Patent [19]

Talsma et al.

[11] 4,238,535

[45] Dec. 9, 1980

[54] CAN COATINGS FROM NITRILE COPOLYMER LATEXES

[75] Inventors: Herbert Talsma, East Cleveland; William M. Giffen, Jr., Aurora, both of Ohio

[73] Assignee: Standard Oil Company, Cleveland, Ohio

[21] Appl. No.: 878,975

[22] Filed: Feb. 17, 1978

Related U.S. Application Data

[60] Continuation-in-part of Ser. No. 772,005, Feb. 25, 1977, abandoned, which is a division of Ser. No. 658,842, Feb. 17, 1976, abandoned.

[51] Int. Cl.$^3$ .............................................. B05D 3/02
[52] U.S. Cl. ............................ 427/388.4; 215/DIG. 6; 427/420; 427/421; 427/428; 427/435; 428/35; 428/462; 428/463
[58] Field of Search ............... 427/388 C, 383 C; 428/463, 462, 35; 260/880 R, 879; 526/342, 328; 215/DIG. 6

[56] References Cited

U.S. PATENT DOCUMENTS

| | | | |
|---|---|---|---|
| 2,777,832 | 1/1957 | Mallison | 260/881 X |
| 2,873,212 | 2/1959 | Roeser et al. | 428/463 |
| 2,873,215 | 2/1959 | Quigley, Jr. et al. | 427/388 C X |
| 2,952,565 | 9/1960 | Contois, Jr. et al. | 427/388 C |
| 3,584,081 | 6/1971 | Dash | 526/342 X |
| 3,676,410 | 7/1972 | Bauer et al. | 526/342 X |
| 3,967,045 | 6/1976 | Kurobe et al. | 427/388 C X |
| 4,064,294 | 12/1977 | Babil et al. | 427/373 |
| 4,103,049 | 7/1978 | Nishida et al. | 427/388 C X |
| 4,140,836 | 2/1979 | Wallace | 427/388 C X |
| 4,141,873 | 2/1979 | Dohany | 427/388 C X |

FOREIGN PATENT DOCUMENTS

| | | | |
|---|---|---|---|
| 47-8709 | 3/1972 | Japan | 427/388 C |
| 873876 | 8/1961 | United Kingdom | 427/388 C |
| 1188814 | 4/1970 | United Kingdom | 428/463 |

*Primary Examiner*—Ronald H. Smith
*Assistant Examiner*—Thurman K. Page
*Attorney, Agent, or Firm*—William D. Mooney; Herbert D. Knudsen; Larry W. Evans

[57] ABSTRACT

Metal surfaces such as steel, tin-plated steel, and aluminum are coated and protected from corrosion by means of an impermeable coating from a latex of a high nitrile polymer.

4 Claims, No Drawings

CAN COATINGS FROM NITRILE COPOLYMER LATEXES

This is a continuation-in-part of U.S. patent application Ser. No. 772,005 filed Feb. 25, 1977, now abandoned, which in turn is a divisional of U.S. patent application Ser. No. 658,842 filed Feb. 17, 1976, now abandoned.

This invention relates to can coatings based on high nitrile copolymer resins, and more particularly pertains to a process for coating with an impervious coating cans and similar materials with a latex of a high nitrile copolymer.

Prior to our invention, it was not practical to use a polymer latex, per se, as a can-coating agent. Cans made of metal, such as tin-plated steel and aluminum, are normally coated with a corrosion-resistant coating to protect the contents on long storage. This is particularly true when foods and beverages are to be stored in the cans. Because the coatings which usually result from use of polymer latexes as the coating agent are not continuous coatings free of pinholes, voids, and the like, polymer coatings are usually applied to cans by means of organic solvents. The use of organic solvents is both expensive and hazardous.

We have discovered that continuous protective films having good chemical resistance can be made from latexes of certain nitrile copolymer latexes which are more fully described below.

The polymer latexes most useful in the present invention are those which result from the polymerization in emulsion of a major proportion of an olefinically unsaturated nitrile, another monomer component copolymerizable therewith and optionally a preformed rubber component.

Usually the latex (or blend of latexes) used in this invention will contain from about 20 to 45% solids and will have average particle sizes ranging from 500 to 3000 angstroms and will be at a pH no greater than 6.7 and preferably from about 4.5 to 6.7.

The polymers which are most useful in the process of this invention include those produced by polymerizing a major proportion of a monounsaturated nitrile, such as acrylonitrile, and a minor proportion of another monovinyl monomer component copolymerizable with said nitrile in aqueous emulsion, optionally in the presence of a preformed diene rubber which may be a homopolymer or a copolymer of a conjugated diene monomer.

The conjugated diene monomers useful in the present invention include butadiene-1,3, isoprene, chloroprene, bromoprene, cyanoprene, 2,3-dimethyl butadiene-1,3, 2-ethyl butadiene-1,3, 2,3-diethyl butadiene-1,3, and the like. Most preferred for the purpose of this invention are butadiene-1,3 and isoprene because of their ready availability and their excellent polymerization properties.

The olefinically unsaturated nitriles useful in the present invention are the alpha,beta-olefinically unsaturated mononitriles having the structure

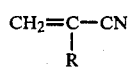

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile and mixtures thereof.

The other monovinyl monomer component copolymerizable with the olefinically unsaturated nitriles and conjugated dienes includes one or more of the esters of olefinically unsaturated carboxylic acids, vinyl esters, vinyl ethers, alpha-olefins, vinyl aromatic monomers, and others.

The esters of olefinically unsaturated carboxylic acids include those having the structure

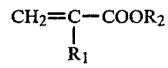

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. Most preferred in the present invention are methyl acrylate, ethyl acrylate, methyl methacrylate, and ethyl methacrylate.

The alpha-olefins useful in the present invention are those having at least 4 and as many as 10 carbon atoms having the structure

wherein R' and R" are alkyl groups having from 1 to 7 carbon atoms, and more specifically isobutylene, 2-methyl butene-1, 2-methyl pentene-1, 2-methyl hexene-1, 2-methyl heptene-1, 2-methyl octene-1, 2-ethyl butene-1, 2-propyl pentene-1, and the like. Most preferred is isobutylene.

The vinyl ethers include methyl vinyl ether, ethyl vinyl ether, the propyl vinyl ethers, the butyl vinyl ethers, methyl isopropenyl ether, ethyl isopropenyl ether, and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates, and the like. Most preferred is vinyl acetate.

The vinyl aromatic monomers include styrene, alpha-methyl styrene, the vinyl toluenes, the vinyl xylenes, and the like. Most preferred is styrene.

Specific polymers useful in this invention are those prepared by the polymerization of 100 parts by weight of (A) from 60 to 90% by weight of at least one nitrile having the structure

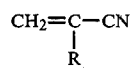

wherein R has the foregoing designation, and (B) from 10 to 40% by weight based on the combined weight of (A) and (B) of at least one member selected from the group consisting of (1) an ester having the structure $$CH_2=C-COOR_2$$
$$\phantom{CH_2=}|$$
$$\phantom{CH_2=}R_1$$

wherein $R_1$ and $R_2$ have the foregoing respective designations, (2) an alpha-olefin having the structure $$\phantom{CH_2=}R'$$
$$\phantom{CH_2=}|$$
$$CH_2=C$$
$$\phantom{CH_2=}|$$
$$\phantom{CH_2=}R''$$

wherein R' and R'' have the foregoing respective designations, (3) a vinyl ether selected from the group consisting of methyl vinyl ether, ethyl vinyl ether, the propyl vinyl ethers, and the butyl vinyl ethers, (4) vinyl acetate, and (5) styrene, in the presence of from 0 to 40 parts by weight of (C) a rubbery polymer of a conjugated diene monomer selected from the group consisting of butadiene and isoprene and optionally a comonomer selected from the group consisting of styrene, a nitrile monomer having the structure $$CH_2=C-CN$$
$$\phantom{CH_2=}|$$
$$\phantom{CH_2=}R$$

wherein R has the foregoing designation, and an ester having the structure $$CH_2=C-COOR_2$$
$$\phantom{CH_2=}|$$
$$\phantom{CH_2=}R_1$$

wherein $R_1$ and $R_2$ have the foregoing respective designations, said rubbery polymer containing from 50 to 100% by weight of polymerized conjugated diene and from 0 to 50% by weight of comonomer.

The polymer latexes useful in the present invention can be prepared in aqueous emulsion by polymerization techniques involving batch, continuous or intermittent addition of monomers and other components. The polymerization is preferably carried out in aqueous medium in the presence of an emulsifier and a free radical generating polymerization initiator at a temperature of from about 0° to 100° C. in the substantial absence of molecular oxygen. The preparation of typical latexes useful in the present invention are more fully described in U.S. Pat. Nos. 3,426,102, 3,586,737 and 3,763,278.

The latexes of this invention are applied to the degreased metal of the can to be coated by means of a doctor knife or wire bar, a roller coater, a spray gun, by dipping the metal into the latex, by flow coating, or by other means known to those skilled in the coating art.

After the latex coating has been dried, the polymer coating is dried at a temperature in the range of from 200° to 300° C. Any of the usual metal sheet used for making cans may be used including steel, tin-plated steel and aluminum.

This invention will be further illustrated in the following examples wherein the amounts of ingredients are given in parts by weight unless otherwise indicated.

EXAMPLE 1

A. A rubber latex was prepared by polymerizing with continuous agitation at 45° C. in the substantial absence of oxygen a mixture of the following ingredients:

| Ingredient | Parts |
| --- | --- |
| acrylonitrile | 40 |
| butadiene-1,3 | 60 |
| Gafac RE-610* (emulsifier) | 2.4 |
| azobisisobutyronitrile | 0.3 |
| t-dodecyl mercaptan | 0.5 |
| water | 200 |

*A mixture of $R-O-(CH_2CH_2O-)_nPO_3M_2$ and $[R-O-(CH_2CH_2O-)_n]_2PO_2M$ wherein n is a number from 1 to 40, R is an alkyl or alkaryl group and preferably a nonyl phenyl group, and M is hydrogen, ammonia or an alkali metal, which composition is sold by GAF Corporation.

Before the reaction was started, the pH of the mixture was adjusted to about 8 with KOH. The polymerization was carried out for 22 and ½ hours to a conversion of 92% and a total solids of 33.1%.

B. A high impact, gas barrier resin was prepared by polymerization of a mixture of the following ingredients:

| Ingredient | Parts |
| --- | --- |
| acrylonitrile | 75 |
| methyl acrylate | 25 |
| latex A (above) | 31.9 |
| potassium persulfate | 0.06 |
| Gafac RE-610 | 3 |
| n-dodecyl mercaptan | 1 |
| ethylene diamine tetraacetic acid | 0.05 |
| water | 200 |

The pH was adjusted to 6.5 with KOH. The polymerization was carried out in the substantial absence of molecular oxygen at 60° C. for 20 hours to produce a conversion of 97% of a latex having 33% solids.

EXAMPLE 2

The procedure of Example 1B was repeated excluding the latex A ingredient. A latex of the copolymer of acrylonitrile and methyl acrylate resulted.

EXAMPLE 3

An acrylonitrile-styrene copolymer was prepared in the presence of a latex of a rubbery butadiene-styrene copolymer (72% by weight of butadiene, 28% by weight of styrene) using the following recipe:

| Ingredient | Parts |
| --- | --- |
| water | 419 |
| Gafac RE-610 | 6.3 |
| t-dodecyl mercaptan | 0.6 |
| azobisisobutyronitrile | 0.5 |
| acrylonitrile | 91.05 |
| styrene | 8.95 |
| styrene-butadiene latex (solids basis) | 10.8 |

The polymerization was carried out at 60° C. in a nitrogen atmosphere. The molar ratio of acrylonitrile/styrene as charged was 20/1. The polymerization time was 130 minutes, and during this time an additional 53 parts of styrene were fed to the reaction mixture. The final latex had a pH of 6.7. A 73% yield of polymer was obtained. A sample of the polymer solid was found to have a nitrogen content of 11.19% by weight which corresponds to an acrylonitrile/styrene mole ratio in the polymer of 1.44/1.

EXAMPLE 4

A latex of an acrylonitrile-stryene copolymer was prepared according to the procedure of Example 3 except that the butadiene-styrene latex was excluded from the recipe.

EXAMPLE 5

A. A sample of the polymer latex described in Example 1B was carefully filtered through coarse filter paper (or cheesecloth) to remove any small particles of polymer ("pre-flock") which might be present. The latex was then thinned by adding from 0 to 3 parts by weight of distilled water per each part by weight of filtered latex. Commonly, 3 parts of water per part of latex were used. The diluted latex was then placed in a spray gun (Binks, Model No. 26). Steel sheet, tin-coated steel sheet and aluminum sheet were all coated by spraying latex on the sheet. In each case, the surface of the flat metal sheet was first cleaned of any oil or grease film that may have been left on it from the metal rolling fabrication. Carbon tetrachloride, or a similar solvent, was used to clean the metal surface.

The resulting clean, dry, metal surfaces were then spray coated with the latex. The spray gun was set to give a fairly light, fine spray. One to five thin, even coatings of latex on a metal surface were made allowing each successive coating to air dry for about 1 minute before the next coating was applied. After the top most layer had air dried, the coated metal sheet was placed in a circulating air oven maintained at about 200° to 220° C. for 1 or 2 minutes. The coated metal sheet was then removed from the oven and allowed to cool to room temperature. Care must be taken to avoid overheating of the coating because polymer degradation might occur on prolonged exposure to high temperature.

The thickness of the final coating was about 0.5 mil, ±0.1 mil. In most cases, the thickness of the coatings thus applied was in the range of 0.1 to 1 mil. Although the coated metal can have any desired dimensions, for testing purposes metal sheets from 4 to 7 mils thick in 5"×8" rectangles were used.

B. The toughness of the polymer coating as applied to the test metal sheets according to A above as well as the adhesion of the coating to the metal surface were determined by a bending test.

In the bending test, the polymer-coated metal sheet was placed in a vise. The sheet was bent away from the coated side, it was then removed from the vise and bent all the way in the same direction so that it doubled back on itself. Thus, the coated side was bent 180° and sharply creased. At this point, the crease on the coated side was inspected for chipping or flaking of the polymer coating from the metal surface.

Next, the polymer-coated metal sheet was placed back in the vise and bent at a different place. This time the coated surface was bent toward itself. Again, a 180° bend was made in the metal sheet with the coated surface on the inside of the sheet. Again, the crease area was inspected for chipping or flaking of polymer. In the case of all three types of coated metal sheet, steel, tin-coated steel, and aluminum, described above, no chipping or flaking of the coating was detected in the bending test.

C. A "punched-hole" test was devised which is a relatively high speed and more severe test than the bending test described in B above.

In the punched-hole test, a coated metal sheet from B above was placed flat over a partly opened vise or over a metal plate with a hole in it. In either case, a hard, solid surface was placed under the coated sheet except for one small area, which was an open space directly beneath the sheet. Directly over this unsupported area in the sheet, a punch was placed and the punch was driven through the sheet by a sharp blow from a hammer. The polymer coating in the area around the resulting jagged hole was inspected for chipping or flaking. The absence of chipping or flaking means the coating is a good one. Poor coatings will show chipping, flaking and cracking of the surface extensively around the punch hole and even back as far as ⅛ to ¼ of an inch from the edge of the hole.

The punch-hole test was run both ways, the coated side of the sheet on top first, then the coated side on the bottom of the sheet second. In the first part of the test, the punch goes down through the coating, the second part the punch is actually coming up through the coating. The coated metal sheet samples prepared in B above all showed essentially no chipping, flaking or cracking and thus demonstrated that they had good coatings in this test.

D. A test, called the pinhole test, was devised to determine whether the polymer coatings on the test sheets described in B above were continuous and free of pinholes and voids in the surface of the coating.

A 2% by weight solution of $CuSO_4.5H_2O$ in distilled water was prepared. The pH of this solution was adjusted to 1 with a small amount of $H_2SO_4$. The coated metal test sheet was then immersed in this solution and in a short time the uncoated side of the metal sheet (steel or tin-coated steel) became coated with copper metal. On the coated side, however, if there were no pinholes, voids or scratches in the polymer coating there was no deposition of copper metal. If the polymer-coated side had pinholes, scratches or voids in the plastic coating, a tiny surface of the metal surface was exposed and copper metal deposited on this exposed surface. When fine scratches were deliberately put in good polymer coatings and the sheets were immersed in the copper sulfate solution, invariably the scratches quickly showed up as fine, dark red lines on the coated side of the steel or tin-plated steel sheets.

A modification of the pinhole test was necessary for samples of polymer-coated aluminum sheet. The copper sulfate solution described above was adjusted to pH 1 with hydrochloric acid rather than sulfuric acid. With this modification, it was found that copper plates out better on aluminum when it is immersed in the solution.

The copper sulfate pinhole test can also be used on polymer-coated sheets which have undergone the bending and punch-hole tests described above. The polymer-coated metal sheets described in B above all were found to have excellent continuous coatings in the copper sulfate pinhole tests.

EXAMPLE 6

A sample of the polymer latex described in Example 1B was carefully filtered through coarse filter paper and used undiluted. Dip coating was done using aluminum sheet and the filtered latex.

The clean, oil-and-grease-free aluminum sheets were dipped down into the latex at room temperature and were held in the down position for from about 5 to 10 seconds. The sheets were then pulled up out of the latex and suspended to drain off excess latex for from about 5 to 15 seconds and to air dry for about 5 minutes. The resulting coated sheets were placed in a circulating air oven for from about 1 to 2 minutes at 200° to 220° C.

In dip coating, both sides of the aluminum sheet were coated, instead of just one side as described for spray coating in Example 5A. The thickness of the coating was determined with a micrometer.

Coatings with an average thickness on one side of 0.3 to 0.4 mil over most of the sheet surface were made.

With dip coating, the coating thickness tends to vary, being thinnest at the upper end of the sheet and thickest at the lower end of the sheet (where draining latex tends to collect). In order to get a more uniform thickness on a sheet, it is recommended that the sheet be rotated during the air-drying step. The dip-coated aluminum sheet prepared in this manner was found to have an excellent coating in the tests described in Example 5B-D.

EXAMPLE 7

A latex sample described in Example 1B was filtered and diluted as described in Example 5A. The latex was coated by roller coating onto clean steel and tin-plated steel sheet. The sheet was placed on a flat, level surface and was taped down at both ends. The dilution factor of distilled water to filtered latex was 1:1 by weight. The latex can also be used undiluted after filtering. A small amount of the diluted latex was poured out across one end of the flat metal sheet. Then a rubber roller was slowly rolled across the sheet, always pushing a tiny wave of the latex before it. A thin layer of the latex adhered to the metal surface after the roller had passed over it. This coating was allowed to air dry for several minutes at room temperature. The coated sheet was then heated at 200° to 220° C. in a circulating air oven.

EXAMPLE 8

The procedures of Example 1 were repeated using the latex described in Example 2. Excellent coatings were achieved on steel, tin-plated steel and aluminum sheets.

EXAMPLE 9

The procedures of Example 1 were repeated using the latex described in Example 3. Excellent coatings were obtained on steel, tin-plated steel and aluminum sheets.

EXAMPLE 10

The procedures of Example 1 were repeated using the latex described in Example 4. Excellent coatings were obtained on steel, tin-plated steel and aluminum sheets.

We claim:

1. The process consisting of coating at least one side of a metal sheet, said metal being selected from the group consisting of steel, tin-plated steel and aluminum, with a layer of a polymer latex maintained at a pH of from 4.5 to 6.7, drying said layer and heating the thus-coated sheet for a short time at a temperature in the range of from 200° to 300° C. wherein the polymer is prepared by polymerization in aqueous emulsion of 100 parts by weight of (A) from 60 to 90% by weight of at least one nitrile having the structure

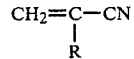

wherein R is hydrogen, a lower alkyl group having from 1 to 4 carbon atoms, or a halogen, and (B) from 10 to 40% by weight based on the combined weight of (A) and (B) of at least one member selected from the group consisting of (1) an ester having the structure

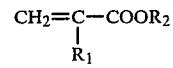

wherein $R_1$ is hydrogen, an alkyl group having from 1 to 4 carbon atoms, or a halogen, and $R_2$ is an alkyl group having from 1 to 6 carbon atoms, (2) an alpha-olefin having the structure

wherein R' and R" are alkyl groups having from 1 to 7 carbon atoms, (3) a vinyl ether selected from the group consisting of methyl vinyl ether, ethyl vinyl ether, the propyl vinyl ethers, and the butyl vinyl ethers, (4) vinyl acetate, and (5) styrene, in the presence of from 0 to 40 parts by weight of (C) a rubbery polymer of a conjugated diene monomer selected from the group consisting of butadiene and isoprene and a comonomer selected from the group consisting of styrene, a monomer having the structure

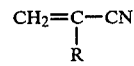

wherein R has the foregoing designation, and an ester having the structure

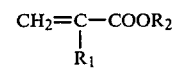

wherein $R_1$ and $R_2$ have the foregoing respective designations, said rubbery polymer containing from 50 to 100% by weight of polymerized conjugated diene and from 0 to 50% by weight of comonomer.

2. The process of claim 1 wherein (A) is acrylonitrile.

3. The process of claim 2 wherein (B) is methyl acrylate.

4. The process of claim 2 wherein (B) is styrene.

* * * * *